United States Patent [19]

Bodor et al.

[11] 4,223,733

[45] Sep. 23, 1980

[54] METHOD FOR CEMENTING OIL WELLS

[75] Inventors: Edward E. Bodor; Joy T. Payton, both of Houston, Tex.

[73] Assignee: Texaco Inc., White Plains, N.Y.

[21] Appl. No.: 973,490

[22] Filed: Dec. 26, 1978

[51] Int. Cl.$^2$ .................... C04B 7/35; E21B 33/138; E21B 33/14
[52] U.S. Cl. ........................ 166/293; 106/90
[58] Field of Search .................. 166/293, 292; 106/90, 106/89, 97, 107, 119

[56] References Cited

U.S. PATENT DOCUMENTS

| | | | |
|---|---|---|---|
| 2,549,507 | 4/1951 | Morgan et al. | 166/293 |
| 2,878,875 | 3/1959 | Dunlap et al. | 166/293 |
| 3,053,674 | 9/1962 | Liberthson et al. | 106/90 |
| 3,188,221 | 6/1965 | Matsuda et al. | 106/90 X |
| 3,317,327 | 5/1967 | Matsuda et al. | 106/90 |
| 3,429,724 | 2/1969 | Keenum, Jr. et al. | 106/90 X |

*Primary Examiner*—Stephen J. Novosad
*Attorney, Agent, or Firm*—Carl G. Ries; Robert A. Kulason; James F. Young

[57] ABSTRACT

This invention relates to an improved oil well cement composition and a method of use thereof in wells penetrating subterranean formations.

5 Claims, No Drawings

METHOD FOR CEMENTING OIL WELLS

BACKGROUND OF THE INVENTION

The invention pertains to an improved cement composition and a method of use thereof in cementing oil wells penetrating subterranean formations. More particularly, the invention relates to an improved method and composition using an additive admixture which controls the setting time of an oil well cement.

PRIOR ART

Cement compositions are usually employed by making an aqueous slurry thereof and employing the slurry in a confined zone at the place to be cemented, the slurry thereafter setting or hardening into a monolithic solid. Among the extensive uses of cement compositions are cementing of wells, e.g. cementing casing in place and cementing of thief zones and zones producing undesirable fluids such as a water-producing stratum in an oil or gas well.

A problem associated with well-cementing operations has been control of the setting time of the cement component of the slurry. Inability to control the setting time can result in poor compressive strength of the set cement is used too soon or an unacceptable delay if too long a time for setting is required.

Prior attempts have been made to control the setting times of aqueous hydraulic cement compositions. These attempts have, in a large number of instances, included incorporating additives into the cement slurry. However many of these additives while controlling the setting time, adversely effect other properties of the slurry such as bleeding, attributable to its free water content. The end result is that the final cement structure is not much better with the additive present that it would be if the additive were not used at all.

The use of calcium and/or sodium lignosulfonates as retarding agents for the setting time of cement in the construction industry is known. However these lignosulfonates are unsuitable cement retarding agents in oil well cementing operations, particularly in deep and hot oil wells because they are unsatisfactory at temperatures exceeding approximately 90.4° C. It is known to use a ferrochrome lignosulfonate in deep and hot oil wells as a cement retarding agent with satisfactory results. However the use of this lignosulfonate increases the cost of the operation significantly.

Zinc salts, such as zinc chloride, zinc nitrate, zinc acetate, zinc sulfate and mixtures have been employed as retarding agents to extend the setting (thickening) time of a cement slurry. However, there are attendant disadvantages accruing from the use of these zinc salts such as the so-called "flash set," or premature stiffening of certain cement slurries a few minutes after mixing.

SUMMARY OF THE INVENTION

The present invention comprises a method of and composition for the retardation of the setting time of a cement-water slurry.

The method comprises cementing a zone in an oil well, penetrating a subterranean formation by injecting down the well and positioning therein opposite the zone to be cemented a hydraulic cement aqueous slurry composition comprising dry hydraulic cement, sufficient water to form a pumpable slurry and a cement retarding additive consisting of from about 0.2 to about 1.0 percent by weight, based on the dry hydraulic cement component of a zinc salt and from about 0.2 to about 1.0 percent by weight of a water soluble ammonium, alkali or alkaline earth metal salt of an alkaryl sulfonic acid, as hereinafter defined, and allowing the composition thus positioned to set to a monolithic mass.

The composition comprises a hydraulic cement aqueous slurry consisting essentially of cement, sufficient water to form a pumpable slurry, and a cement retarding additive consisting of from about 0.2 to about 1% by weight, basis cement, of a zinc salt and from about 0.2 to about 1.0% by weight, basis cement, of a water soluble ammonium, alkali or alkaline earth metal salt of an alkaryl sulfonic acid.

By the method and composition of the present invention one is able to effect placement of the hydraulic cement aqueous slurry composition in an efficient manner without many of the attendant disadvantages heretofore associated with the prior art cementing methods and compositions.

Among the unexpected advantages accruing from the method and composition of the present invention is extending the setting times of cement compositions to an unexpected degree. This surprising result provides the operator with sufficient time to obtain adequate and thorough mixing of the composition at the well site without undue concern for flash setting or rapid setting of the composition. Moreover, the extended setting times permit slower injection rates to be used when pumping the composition down hole, thus avoiding air entrainment within the slurry.

DESCRIPTION OF THE PREFERRED EMBODIMENT

The oil well cement additive used in the method and cement composition of the present invention is an admixture of a water soluble or dispersible zinc salt or salts and a water soluble ammonium or alkali metal or alkaline earth metal salt of an alkaryl sulfonic acid such as a $C_6$–$C_{13}$ alkylbenzenesulfonic acid salt, preferably a $C_6$–$C_9$ alkylbenzenesulfonic acid salt, or the corresponding alkyl napthalene sulfonic acid salt, preferably a $C_6$–$C_{13}$ alkyl naphthalene sulfonic acid salt.

As used in the accompanying specification and claims, the expression "salt of an alkaryl sulfonic acid" is intended to cover any of the above classes of compounds.

Suitable zinc salt components include zinc chloride, zinc oxide and zinc sulfate and particularly zinc chloride. The zinc salt component is admixed with the cement component of the composition of the invention in an amount of from about 0.2 to 1% by weight, basis cement, and preferably from about 0.5 to 1% by weight.

Suitable salts of the alkaryl sulfonic acid component of the admixture include the ammonium, sodium and calcium salts of an alkaryl sulfonic acid, particularly a salt of an alkaryl sulfonic acid commercially available under the tradename CFR-2$^R$ from Halliburton.

The salt of an alkaryl sulfonic acid component is admixed with the cement component of the composition of the invention in an amount of from about 0.2 to 1% by weight, basis cement, and preferably from about 0.5 to 1% by weight.

The cement component of the composition can be any type of oil well cement such as a hydraulic cement. A hydraulic cement is defined as any cement which will set or cure under the action of water, and is intended to include all mixtures of lime, silica and alumina, or of lime and magnesia, silica and alumina and iron oxide. Hydraulic cements include hydraulic limes, pozzolan cements, natural cements, and portland cements. Pozzolan cements include slag cements made from slaked lime and granulated blast furnace slag. Among these hydraulic cements, the portland cements are preferred, chiefly because of their superior strength characteristics. The term portland cement is intended to include any cement regarded in the cementing art as a portland cement, usually as defined by standard reference works. The precise composition of any one particular portland cement will vary from another, but generally portland cements are produced by mixing and grinding together a calcareous and an argillaceous material, kiln heating the mixture (1350° to 1800° C.) until vitrification begins, pulverizing the clinker thus produced and mixing the same with a small amount of gypsum. The portland cements may be useful in the present invention and should have a minimum fineness of at least about 1500 cm$^2$/gram by the Wagner turbidimeter method or 2500 cm$^2$/gram by the Blaine air permeability method.

A preferred cement component is a class H portland cement having a density of about 94 pounds per cubic foot and an approximate chemical analysis as follows: silicon dioxide 22.4% aluminum oxide 4.8%, ferric oxide 4.1%, calcium oxide 64.8% magnesium oxide 1.1%, sulfur trioxide 1.7%, loss in weight on ignition about 0.5%, and having a minimum fineness of at least 1500 cm$^2$/gram, measured by the Wagner turbidimeter.

The amount of water employed to make up the hydraulic cement slurry is not critical and generally the amount of water necessary to give a settable cement composition having the required characteristics will be in an amount of from about 25% to about 60% by weight, based on the weight of the composition. The amount of water employed should be only such as is sufficient to produce a pumpable slurry.

A preferred quantity of water for slurry formation is from about 40 to 55%, preferably about 42–48%.

The method of the present invention comprises forming an aqueous slurry of the various components of the composition of the invention and pumping said slurry down the well bore under pressure sufficient to force the slurry into and about the area being cemented. After being so placed the formation is shut in for a time period sufficient to permit the cement component to set and form an impervious barrier therein having an adequate compressive strength. Thereafter the well can be equipped for production.

Following is a description by way of example of a method of carrying out the practice of the present invention.

A Class H Cement having a density of about 94 pounds per cubic foot and a chemical analysis approximately as follows: silicon dioxide 22.4%, aluminum oxide 4.8%, ferric oxide 4.1%, calcium oxide 64.8%, magnesium oxide 1.1%, and sulfur trioxide 1.7%, with a loss on ignition of approximately 0.5%, and a fineness of at least 1500 cm$^2$/gram by the Wagner turbidimeter method was used as the cement component.

CONTROL EXAMPLE A

There was added to a portion of this cement sufficient water to form a pumpable neat slurry. The cement to water ratio of the slurry was 1.0/0.46 on a weight basis.

This slurry was evaluated in a Halliburton type atmospheric consistometer to determine the thickening time thereof. The expression "thickening time" refers to the time period elapsed from the start of mixing the slurry to the arbitarily selected pumpability limit of 30 units. This upper limit was selected based on our laboratory and limited field experience as a practical upper limit for pumpability. A slurry is easily pumpable if it has a consistency of 5–15 units, becomes less pumpable if this is exceeded, and unpumpable at consistency units of 30 and higher.

At periodic intervals the consistency of the slurry was recorded. The elapsed thickening time until 30 consistency units were reached was recorded as the thickening time. This evaluation was conducted at a simulated test depth of 3,600 meters and at a temperature of 78° C. The results are shown in Table A below.

COMPARATIVE EXAMPLE B

The cement slurry of Control Example A above was used in this Example. There was added thereto sufficient zinc chloride to provide a concentration of 0.5% by weight of zinc chloride, based on the cement component.

This slurry was evaluated as described above and the results are set forth in Table A.

COMPARATIVE EXAMPLE C

The cement slurry of Control Example A was used in this Example.

There was added thereto a sufficient quantity of a sodium salt of a $C_6$–$C_{13}$ alkyl naphthalene sulfonic acid known by the tradename CFR-2$^R$, to provide a concentration therein of 0.4% by weight, basis the cement component.

This slurry was evaluated as described above and the results are set forth in Table A.

EXAMPLE 1

The cement slurry of Control Example A was used in this Example.

There was added thereto with mixing, 0.5% by weight of zinc chloride and 0.4% by weight of the sodium salt of a $C_6$–$C_{13}$ alkyl naphthalene sulfonic acid CFR-2$^R$, based on the weight of the cement component.

The resulting slurry was evaluated as described above and the results recorded in Table A below.

TABLE A

| | THICKENING TIMES IN SIMULATED 3600 m WELL AT 78° C. | | |
|---|---|---|---|
| EXAMPLE | | ADDITIVE (WEIGHT %, BASIS CEMENT) | ELAPSED TIME FROM START OF MIXING (MINUTES) |
| A | Cement-Water Slurry 1.0/0.46 Ratio | — | 134 |
| B | Example A plus | 0.5% ZnCl$_2$ | 194 |
| C | Example A plus | 0.4% CFR-2* | 146 |
| 1 | Example A plus | 0.5% ZnCl$_2$ plus 0.4% CFR-2 | 236 |

*CFR-2 - sodium salt of $C_6$–13 alkyl naphthalene sulfonic acid.

The data in Table A above show that the elapsed time for the thickening of the compositions of the invention as exemplified in Example 1, was surprisingly greater than the elapsed times for the Control Example A and Comparative Examples B and C. The elapsed thickening time of Example 1 (236 minutes) was 76.1% longer than the 134 minutes elapsed for Control Example A; 21.6% longer than the 194 minutes elapsed for Comparative Example B and 61.6% longer than the 146 minutes elapsed for Comparative Example C.

Another series of tests were conducted in a simulated 4,200 meter well at 96° C. The slurry of Control Example A described above was used as the base slurry.

COMPARATIVE EXAMPLE D

The composition of Comparative Example C was used in this test, except that the concentration of the sodium salt of a $C_6$-$C_{13}$ alkyl naphthalene sulfonic acid for Comparative Example D was increased to 0.6% by weight, basis cement.

EXAMPLE 2

Example 1 was used in this test except the concentration of both components, zinc chloride and the sodium salt of a $C_6$-$C_{13}$ alkyl naphthalene sulfonic acid, was increased to 0.6% by weight for each component, basis cement.

TABLE B

| | THICKENING TIMES IN SIMULATED 4200 m WELL AT 96° C. | | |
|---|---|---|---|
| EXAMPLE | | ADDITIVE (WEIGHT %, BASIS CEMENT) | ELAPSED TIME FROM START OF MIXING (MINUTES) |
| Control Example A | Cement-Water Slurry 1.0/0.46 ratio | — | 125 |
| Comparative Example D | Example A plus | 0.6 wt. % CFR-2* | 130 |
| Example 2 | Example A plus | 0.6 wt. % $ZnCl_2$ plus 0.6 wt. % CFR-2 | 190 |

*CFR-2 - Sodium salt of a $C_6$-$C_{13}$ alkyl naphthalene sulfonic acid

As shown in Table B, the retardation of thickening time is lengthened with the compositions of the invention.

The limit of pumpability with Control Example A (no additives) was obtained after 125 minutes.

Comparative Example D extended the retardation time to 130 minutes by the addition of 0.6 wt. % of the sodium salt of a $C_6$-$C_{13}$ alkyl naphthalene sulfonic acid to the Control Example Cement-Water Slurry, an increase of only 4%.

As shown in Example 2, the composition of the invention increased the retardation of thickening time to 190 minutes. This increased retardation time for Example 2 is 65 minutes longer than the retardation time for Control Example A, a 52% increase. Moreover the increase in retardation time for Example 2 was 60 minutes longer than the time for Comparative Example D, a 46.2% increase.

The data in the above examples show that the combined retarding effect of zinc salts and the sodium salt of a $C_6$-$C_{13}$ alkyl naphthalene sulfonic acid is unexpectedly superior to each of these additives alone as is evidenced by the substantial increases in retarding time obtained thereby. The method and composition of the present invention overcomes the "flash set" effect heretofore encountered with cement slurries containing zinc salts.

Obviously, many modifications and variations of the invention as hereinabove set forth may be made without departing from the spirit and scope thereof and only such limitations should be applied as are indicated in the appended claims.

We claim:

1. A method of cementing a zone in an oil well penetrating a subterranean formation at elevated temperatures up to about 96° C. comprising injecting down the well and positioning in the zone to be cemented a hydraulic cement aqueous slurry composition comprising dry hydraulic cement, sufficient water to form a pumpable slurry and a cement retarding additive consisting of from about 0.2 to about 1.0 percent by weight, based on the dry hydraulic cement component, of a zinc salt selected from the group consisting of zinc chloride, zinc oxide and zinc sulfate and from about 0.2 to about 1.0 percent by weight of a water soluble ammonium, alkali or alkaline earth metal salt of an alkaryl sulfonic acid, and allowing the composition thus positioned to set to a monolithic mass.

2. Method as claimed in claim 1 wherein the concentration of said zinc salt is from about 0.5 to about 1% by weight.

3. Method as claimed in claim 1 wherein said zinc salt is zinc chloride or zinc oxide or zinc sulfate.

4. Method as claimed in claim 1 wherein the concentration of said salt of an alkaryl sulfonic acid is about 0.5% by weight.

5. Method as claimed in claim 1 wherein said salt of an alkaryl sulfonic acid is a sodium salt of a $C_6$-$C_{13}$ alkyl naphthalene sulfonic acid.

* * * * *